May 20, 1941.  W. T. REA  2,242,324
TESTING DEVICE
Filed Oct. 6, 1938  2 Sheets-Sheet 1
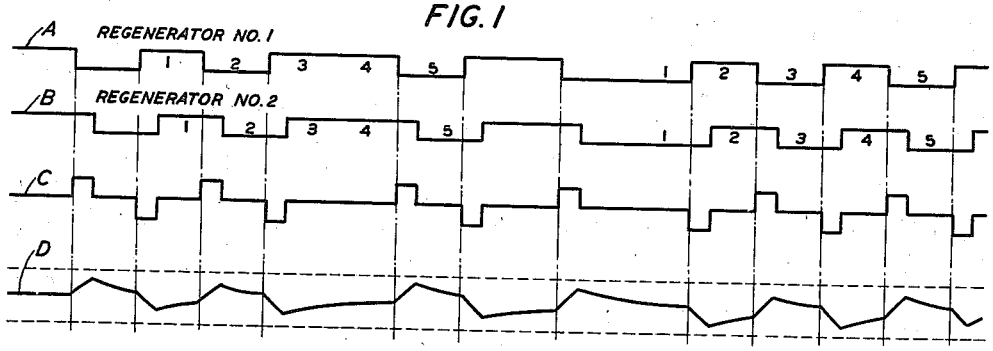
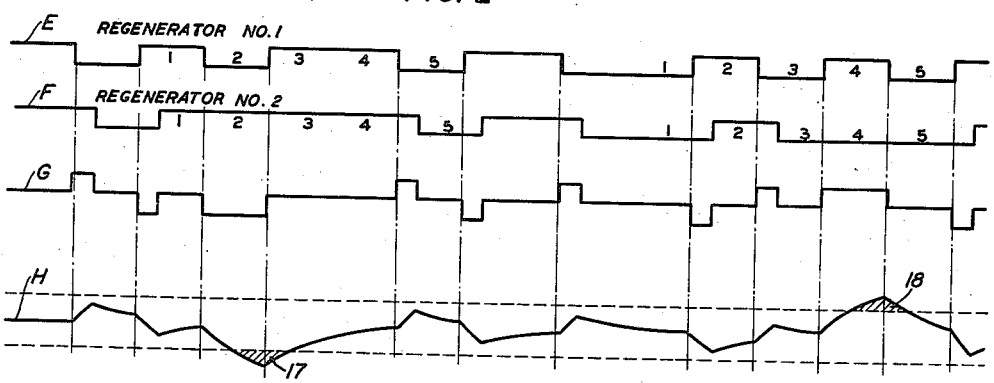
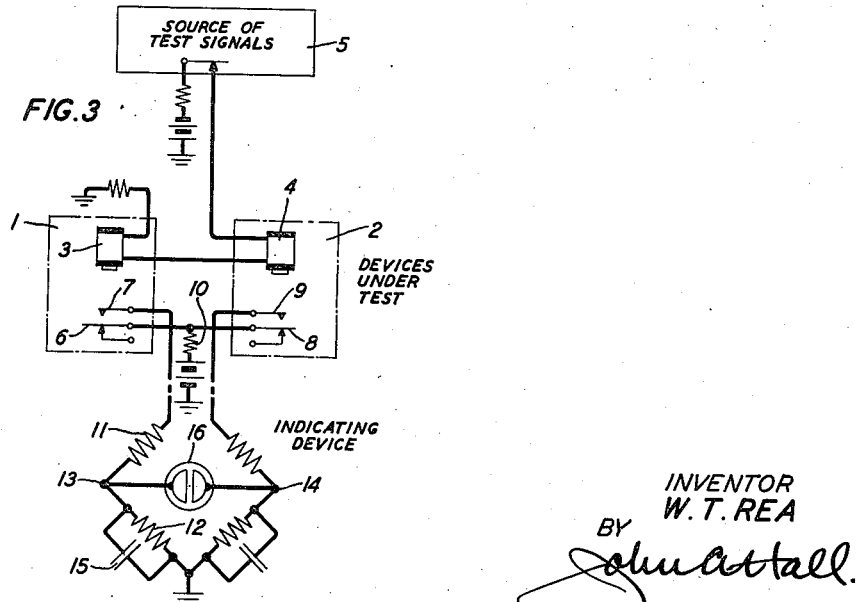
INVENTOR
W. T. REA
BY
John C. Hall.
ATTORNEY

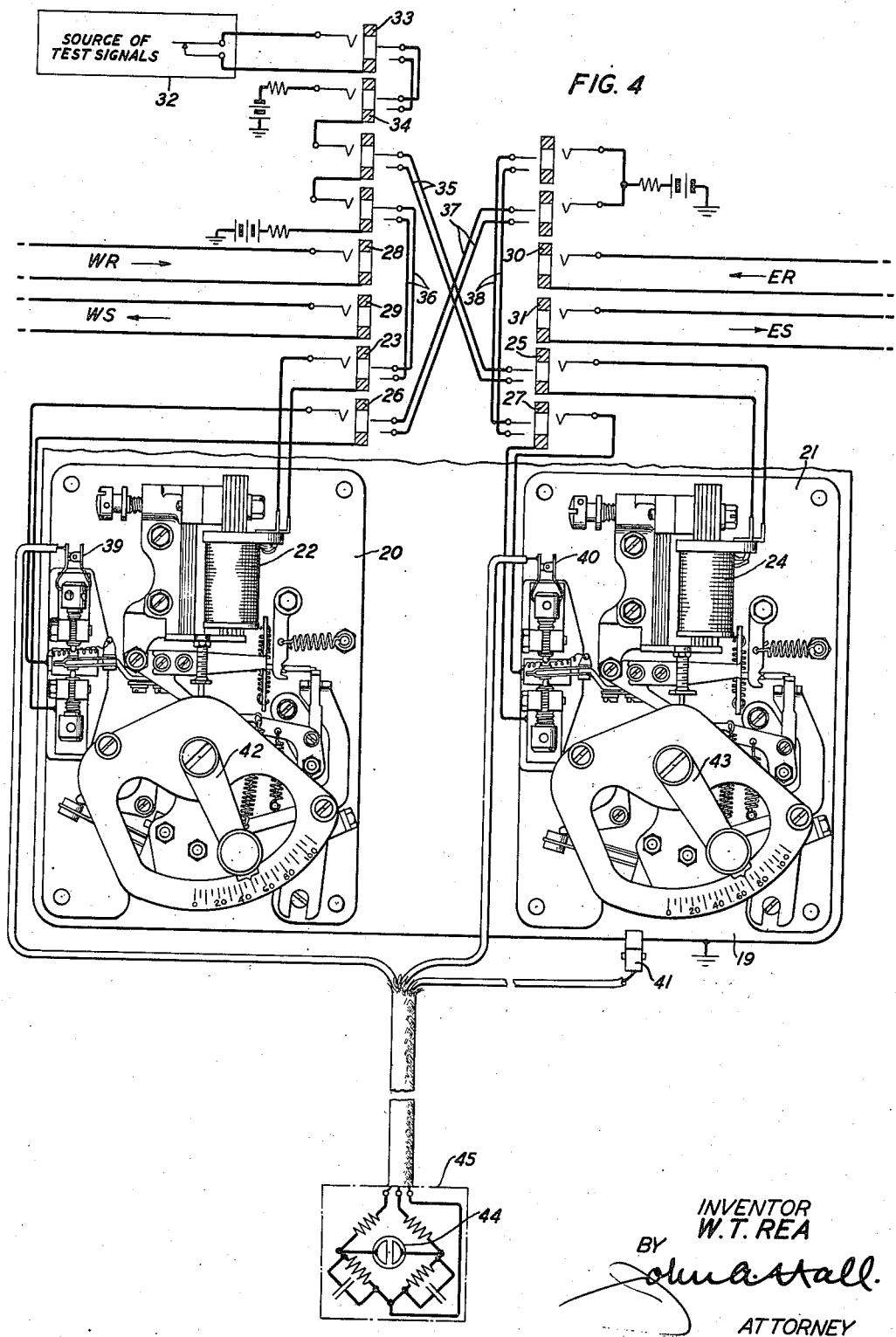

Patented May 20, 1941

2,242,324

UNITED STATES PATENT OFFICE 2,242,324

TESTING DEVICE

Wilton T. Rea, Bayside, N. Y., assignor to Bell Telephone Laboratories, Incorporated, New York, N. Y., a corporation of New York Application October 6, 1938, Serial No. 233,551

4 Claims. (Cl. 178—69)

This invention relates to electrical testing equipment and particularly to a method of and means for testing telegraph repeaters or like apparatus where spaced impulses are employed for signaling.

The object of the invention is to provide simple and reliable testing means for use in plant maintenance for checking the proper operation of impulse operated devices. As an example, the invention is useful in the operation of adjusting certain types of mechanical regenerative repeaters and other teletypewriter apparatus provided with orientation devices by which such apparatus may be adjusted in its response to impulses delayed or distorted by various causes. Where, for instance, a pair of mechanical regenerative units are employed in a duplex circuit such units are generally mounted side by side and hence the operation of setting their orientation adjustments is with the aid of the present invention a very simple matter.

Heretofore it required the services of at least two men to make an orientation adjustment, that is, one man to make the trial adjustments at the regenerator panel and another man in a different place to observe and call out to the first the results as they appeared on a monitoring teletypewriter. Since the present invention can be made portable the results of the trial adjustments at the regenerator panel can be made and observed by the same individual, thus dispensing with the services of the second worker.

In general the invention consists of a device which will give a visual indication only when a given potential has been exceeded, wired in a timing network which allows an applied potential to build up to its full value only at a certain rate. The apparatus to be tested is then connected to a source of impulses and the impulses which have been affected by such apparatus are compared with the impulses unaffected. Due to the movement of the orientation adjustment the output will differ more and more from the input until a point is reached where the apparatus fails to function properly. While the apparatus is functioning properly the difference between the input and the output is expressed in the form of a series of very short impulses but these are of an insufficient value to cause a visual indication. As soon, however, as the apparatus begins to make an occasional error, each such error will be expressed as a longer impulse of sufficient length to cause a visual indication. Thus the limits of proper operation in each direction may be noted and the orientation device finally set midway between such limits.

A preferred form of visual indicating device is the cold cathode glow tube, such as the small neon lamp. This device has characteristics which make it ideal for this purpose since it is simple, light in weight, has long life and will not glow until the applied potential has exceeded a given value. Such a glow lamp may be mounted in a unit with condensers and resistances in a form to be held in the hand and three leads may be clipped to appropriate contacts of the mounted apparatus so that the maintenance man holding this indicator in one hand may make a mechanical adjustment with the other. In another form this testing unit may be wired into a panel where it may be connected to the apparatus to be tested either by keys or by jacks and plugs.

The drawings consist of four figures on two sheets:

Figs. 1 and 2 are theoretical explanatory diagrams of current impulses;

Fig. 3 is a schematic circuit diagram; and

Fig. 4 is a circuit diagram with front views of two mechanical regenerative repeaters mounted on a common plate.

In Fig. 1, the first line marked A represents a series of marking and spacing impulses of idealized form as sent from one regenerator unit. The second line marked B represents the same series of impulses as sent by a second regenerator unit in which the orientation device is set differently from the first regenerator unit. It should be noted that both the marking and spacing impulses in the second line B follow at a short interval after the corresponding impulses in the line A. The line C represents the difference between the timing of the impulses represented by line A and the impulses represented by the line B. The differences consisting of a series of very short impulses may be measured by appropriate means as will hereinafter be described. Such short impulses if fed into a circuit having certain timing characteristics will give rise to a potential which is graphically illustrated by the line D. It should be noted that above and below the line D there are two broken lines indicating certain limits. Since the short impulses resulting from the difference in time between the impulses represented by the line A and those represented by the line B are regular in length, it will be noted that at no point does the potential in graph D rise above or below the limits indicated by the broken line. Thus, if potential of this nature is fed into an indicating device, such as will hereinafter be described, which is responsive only to potentials above a certain value, such indicating device will not be operated.

Attention is now directed to Fig. 2 in which lines E and F correspond respectively to lines A and B of Fig. 1. In this case, however, it is assumed that the regenerator unit represented by the line F has been so adjusted that it fails to respond perfectly. Hence, the line G, which represents the difference between the impulses of line E and line F, contains one or more impulses of longer duration than usual. In this case the potential graph H shows an occasional point where the potential exceeds the lower and upper reference values. When this occurs, the indicating device will operate and thus give an indication of the failure of the regenerator unit represented by the line F to operate properly.

Fig. 3 is a schematic representation of two teletypewriter units 1 and 2. The responding magnets 3 and 4 of these units are placed in series with a source of test signals 5. These test signals may be transmitted in any manner, either manually or automatically. Generally, there is provided a source of automatically transmitted signals in which any desired value of pre-distortion may be introduced. Each of the devices 1 and 2 under test has an orientation device which is well known in the art and is not illustrated in this figure. Such orientation device changes the response of the contacts 6 and 7 of the device 1 and the contacts 8 and 9 of the device 2. If then it is assumed that the orientation device of unit 1 is adjusted properly, the device 1 may be used as a standard and the signals sent out by the contacts 6 and 7 will be as shown in line A, Fig. 1. If the orientation device of teletypewriter unit 2 is changed, then the signals sent out by the contacts 8 and 9 will be as represented by line B in Fig. 1. If contacts 6 and 7 are closed, there will be a current flow from battery, resistance 10, contacts 6 and 7, resistance 11 and resistance 12 to ground, making the potential at point 13 different from the potential at point 14. Due to the condenser 15, the rise in potential difference at point 13 will be as represented by the graph D in Fig. 1. If this rise is continued over a comparatively long period, then the potential difference across the glow lamp 16 will reach a point where the glow lamp will operate. If, however, the device 2 is responding properly to the test signals, then shortly after the contacts 6 and 7 have been closed the contacts 8 and 9 will be closed, and, therefore, the point 14 will tend to rise to the same potential as the point 13. If the orientation device of unit 2 has been moved beyond the limit of proper operation, then an occasional error will appear, as indicated by the line F in Fig. 2, and, therefore, the potential difference between points 13 and 14 will be as indicated by line G in Fig. 2 and the result will be that at the points 17 and 18 of graph H in Fig. 2, the potential across the glow lamp 16 will rise to the point of operating such glow lamp.

Fig. 4 well illustrates how this testing device may be used practically. There is provided a mounting plate 19 which is grounded as indicated. Upon this mounting plate there are mounted two mechanical regenerative repeaters 20 and 21 which may correspond to the devices 1 and 2 of Fig. 3. Usually, the various circuits of such devices are terminated in jacks as, for instance, the magnet 22 is terminated in jack 23, the magnet 24 is terminated in jack 25 and the moving and lower contacts of regenerator 20 are terminated in jack 26 while the moving and lower contacts of regenerator 21 are terminated in jack 27. Under service conditions, a west receiving line terminated in jack 28 is patched by a cord ending at each end in a plug to magnet 24 by way of jack 25 and a west sending line terminating in jack 29 is patched to jack 27 so that impulses coming over the west receiving line and operating magnet 24 are repeated by the contacts of regenerator 21 to the west sending line. Similarly, the east receiving line is patched from jack 30 to jack 23 and the east sending line is patched from the jack 31 to jack 26. For the purpose of setting up a test circuit, as indicated schematically in Fig. 3, a source of test signals 32 terminating in jack 33 is patched to jack 34 and other patching cords, such as 35, 36, 37 and 38, are placed as indicated with the result that a circuit, as schematically indicated in Fig. 3, is established. The testing device, comprising as it does merely a small glow lamp and several resistances and condensers, can be made up in a form small enough to be held in the hand of an operator. Such device then is provided with a flexible cord having three terminals which may be connected by terminal clips 39, 40 and 41 to appropriate points. The terminal clip 39 is attached to the spacing contact of the regenerator 20. Terminal clip 40 is attached to the spacing contact of regenerator unit 21 and terminal clip 41 is attached to the mounting plate 19 so as to get a ground connection. The orientation adjusting device 42 of generator 20 is placed at its mid-point where it will be assumed to be in its most favorable position. The orientation adjusting device 43 is then moved on its scale until the glow lamp 44 begins to flash occasionally. This will indicate that one limit of orientation has been reached. After that the orientation adjusting device 43 is moved in the opposite direction until flashing of glow lamp 44 again occurs, whereupon the limit in the other direction is noted. Thereafter the orientation adjusting device 43 may be set at the mid-point between these limits.

The testing device 45 may be used in a variety of ways for testing and adjusting teletypewriter units. The mechanical regenerative units here shown are used merely to indicate the ease with which the testing may be done, but the device is not limited to use with this type of apparatus alone.

What is claimed is:

1. In a telegraph system, a telegraph repeater adjusting circuit comprising a pair of repeaters having input circuits connectable to a common local source of electrical impulses, an individual electric time delay network connected to the output of each repeater, and a bridge, comprising means for indicating a failure in the operation of one of said repeaters, connected between said networks.

2. In a telegraph system, a testing circuit for telegraph repeaters, comprising a first and a second telegraph repeater, means for arranging said repeaters so that they both receive identical electric impulses substantially simultaneously, an independent local output circuit connected to each repeater, an electric potential change delay circuit, including a resistance and a condenser connected to each of said output circuits and an indicating device, comprising a cold cathode glow lamp, connected between said delay circuits for recording only variations in the transmission of signals through said output circuits of a magnitude beyond allowable limits.

3. A testing device for measuring variations in the response of two electrical relays, comprising a series circuit extending through the windings of said relays, said circuit including means for interrupting the flow of current through said relays, two corresponding circuit branches each extending individually through a pair of contacts on one or the other of said relays to corresponding plates of an individual condenser in each branch, means for impressing a potential across each condenser when the contacts in its individual branch are closed, means including an indicator connecting said condenser plates, and means in said device for operating said indicator when the variation in the response of said relays to said interruptions exceeds a permissible tolerance.

4. A telegraph testing device including a first and a second electrical relay, each comprising a winding and a pair of electrical contacts conditioned by the effect of current through said winding to make and break, an electrical current path extending through said windings in series, means in said path for interrupting the flow of current through said path to control said making and breaking, an electrical circuit comprising a first and a second parallel branch, each branch comprising a pair of said contacts and an equal resistance, said resistance being shunted by a condenser of uniform capacitance in each branch, a cold cathode glow tube bridged across said branches at corresponding points, and means in said device responsive to a change in potential of one of said points relative to the other of said points to light said tube as an indication that the response of said relays to said interruptions is beyond a permissible range of variation.

WILTON T. REA.